Feb. 15, 1955  E. L. GINZTON  2,702,366

HIGH-FREQUENCY IMPEDANCE MEASURING DEVICE

Filed March 22, 1950  2 Sheets-Sheet 1

INVENTOR
EDWARD L. GINZTON
BY
Paul B. Hunter.
ATTORNEY

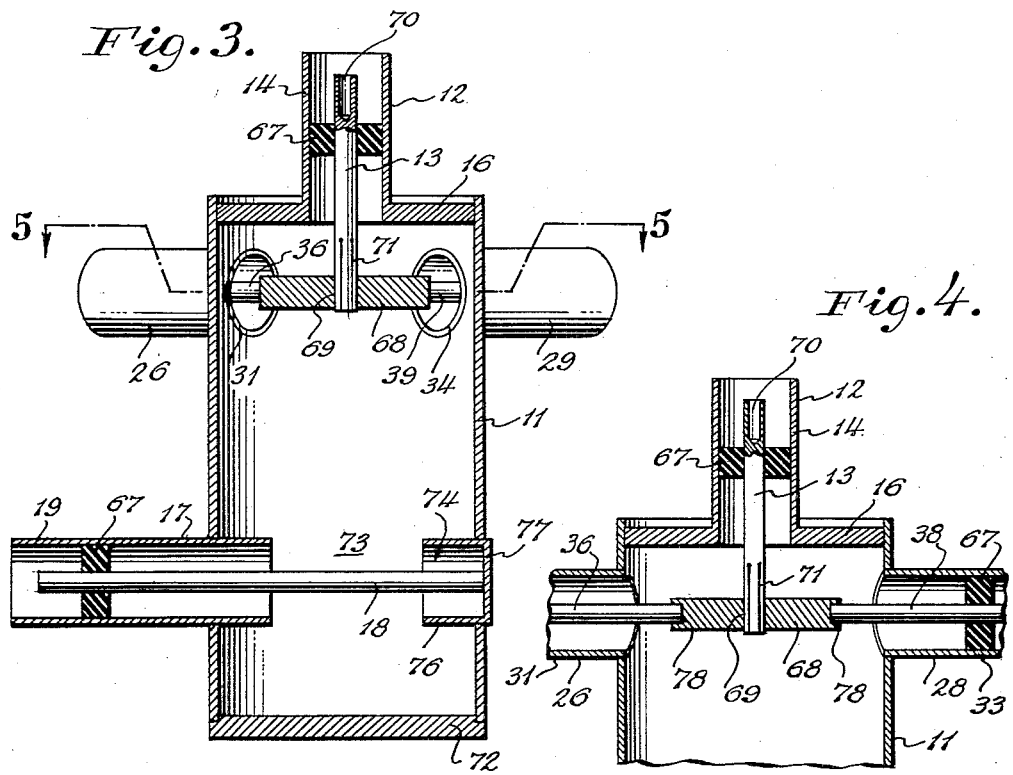

United States Patent Office 2,702,366
Patented Feb. 15, 1955

2,702,366

HIGH-FREQUENCY IMPEDANCE MEASURING DEVICE

Edward L. Ginzton, Los Altos, Calif., assignor to The Board of Trustees of The Leland Stanford Junior University, Stanford University, Calif., a legal entity of California Application March 22, 1950, Serial No. 151,085

10 Claims. (Cl. 324—58)

This invention relates to impedance measuring apparatus for use especially in connection with ultra high frequency waves.

Although impedance measuring devices have been constructed that function at frequencies in the neighborhood of 20 megacycles per second, little has been done in constructing bridge circuit devices that operate at very high frequencies such as those of the order of $10^8$ cycles per second, owing to the various complications which arise with an increased frequency range. The distributed constants of the usual bridge circuit have a greater influence upon the action of bridge circuit devices as the range of frequency is increased. For example, the use of the usual bridge circuit devices at ultra high frequencies is adversely affected by the impedance and calibration of the indicating instrument, by the effect of the leads to the auxiliary equipment, and similar factors which vary with frequency. Consequently, the useful frequency range of one of these bridge circuit devices is rather limited.

To meet the needs for the measurement of impedances at ultra high frequencies, attempts have been made to provide suitable devices. Most of these instruments are based upon the attainment of an equality of two impedances. In this respect, they differ from the more generally known bridge circuit device in which the products of two pairs of impedances are made equal. For instance, in a magic tee, essentially two impedances are employed which are equal to one another. If such a device is to be employed to measure the value of one of the impedances, then a standard impedance is required which has a variable resistance and a variable reactance, both of which must be accurately known. The fabrication of a standard impedance, calibrated both as the resistance and reactance, is extremely difficult; for this reason, the magic tee, as a practical matter, is not used in the measurement of impedances.

The impedance measuring apparatus of the present invention overcomes these and related difficulties associated with such known devices.

It is an object of the present invention to provide an improved impedance measuring device, and one for use specially with signals of high frequency.

Another object is to provide an ultra high frequency six terminal-pair impedance measuring network.

It is a further object to provide a coaxial transmission line type of impedance determining apparatus.

Still another object is to provide an impedance measuring device constituted essentially of electromagnetic conductors of the coaxial transmission line and wave guide type.

Another object of the present invention is to provide an ultra high frequency impedance measuring device in which the necessity for a standard impedance having a variable resistance is eliminated.

A further object is to provide an electromagnetic energy mode transducer for obtaining the circular wave guide $TE_{1,1}$ energy mode.

A still further object lies in the provision of means for controlling the orientation of the polarization of electromagnetic energy of the $TE_{1,1}$ mode.

In the drawings:

Fig. 3 is an elevational view, mainly in cross section, taken along line 3—3 of Fig. 2.

Fig. 4 is a fragmentary view, mainly in cross section, taken along line 4—4 of Fig. 2.

Fig. 5 is a plan view, mainly in cross section, taken along line 5—5 of Fig. 3.

Fig. 6 is a cross sectional fragmentary view of an energy extracting means constituting an alternate arrangement.

Similar characters of reference are used in all of the above figures to indicate corresponding parts.

Figure 1:
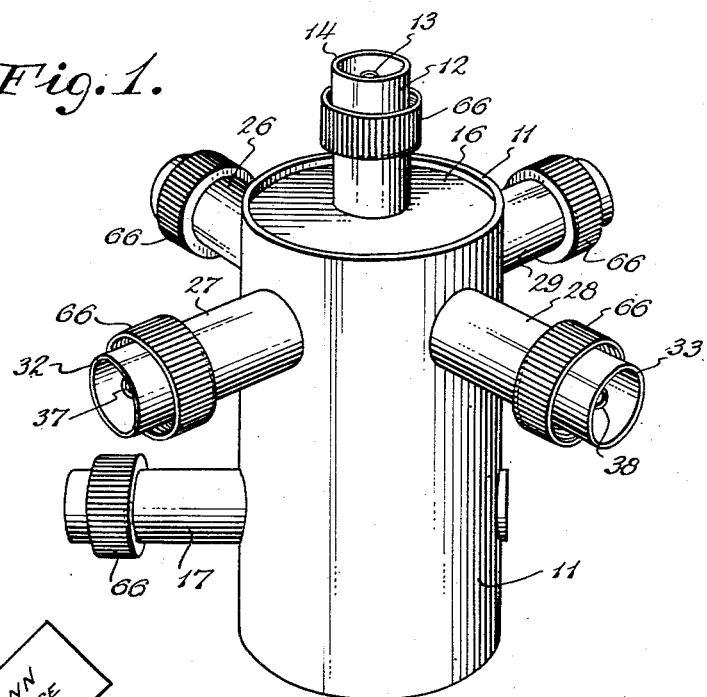
Fig. 1 is a perspective view of a preferred form of the impedance measuring device of the present invention.
Figure 2:
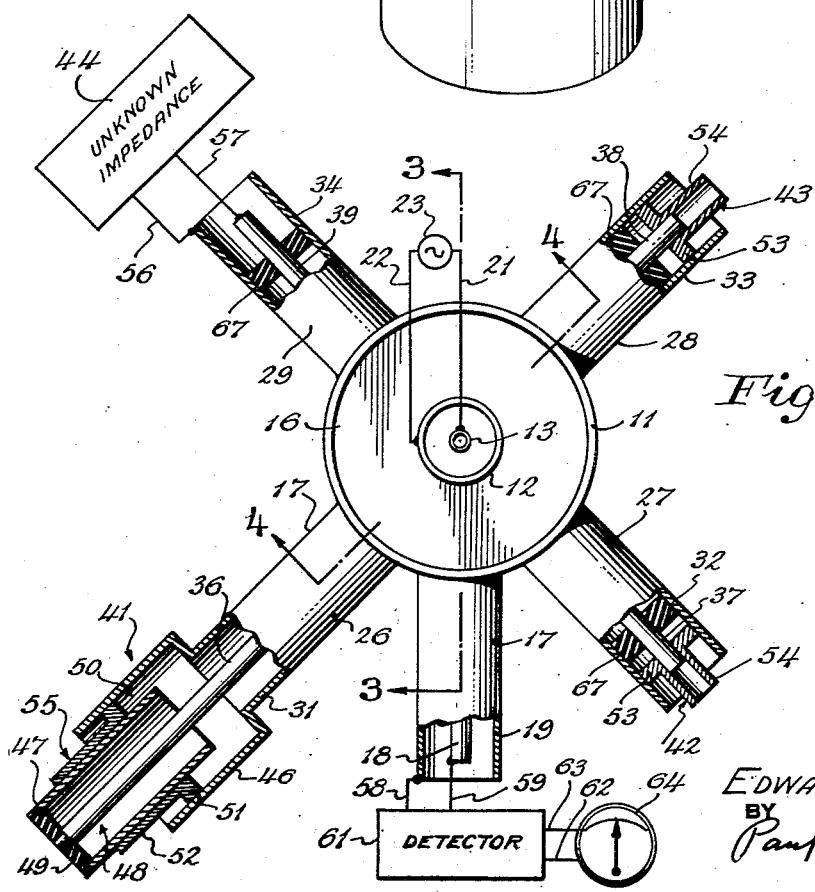
Fig. 2 is a plan view, partly in cross section and partly schematic, of the device of Fig. 1.

Referring to Figs. 1 and 2, an electromagnetic wave energy conductor or conductor means, such as pipe or conduit 11, having a longitudinal axis and being substantially circular in cross section, is provided at its upper or input end with an electromagnetic energy input coupling line 12, having a rod or inner conductor 13 and a tube or outer conductor 14. The input coaxial transmission line 12 may be substantially aligned along the longitudinal axis of the conduit 11 and mounted on an end plate 16 thereof. For the removal of electromagnetic energy from the conduit 11 there is provided an electromagnetic energy output coupling means, such as output coaxial transmission line 17, with a rod or inner conductor 18 and a tube or outer conductor 19.

As is shown in Fig. 2 the input coaxial transmission line 12 may be connected by means of leads 21, 22 to a source 23 of energy, which may be of the oscillatory variety. The conduit 11 is preferably dimensioned to transmit the $TE_{1,1}$ wave or mode of electromagnetic energy. At times, such a mode is designated the $H_1$ wave or mode. While the radius of the conduit 11 is selected to effect a transmission of energy of the $TE_{1,1}$ mode, the radius is preferably chosen to minimize or substantially eliminate the passage of energy of the higher order modes, such as the $TM_{0,1}$; $TE_{2,1}$; $TE_{0,1}$; and so forth, through the conduit 11. Thus, by suitable dimensioning of the conduit 11, only the dominant or principal mode of a circular wave guide may be transmitted in the conduit 11 without excessive attenuation. In other words, the higher order modes are greatly attenuated.

As is known, the action of a wave guide, such as conduit 11, for any given mode of transmission is similar to a high-pass filter, with reactive attenuation occurring for signals with frequencies below cutoff. The $TE_{1,1}$ mode or dominant mode for the circular wave guide has the longest cutoff wavelength.

Along the length of conduit 11 and adjacent the input coaxial transmission line 12 is an electromagnetic mode transducing means or a means for controlling the polarization of electromagnetic energy, including a system of four coaxial transmission lines 26–29 projecting radially from the conduit 11. The axes of these four lines 26–29 are preferably mutually perpendicular, intersect in a point along the longitudinal axis of conduit 11, and are disposed in a plane which is oriented at right angles relative to the longitudinal axis of conduit 11. Coaxial transmission lines 26–29 have tubes or outer conductors 31–34, respectively, and rods or inner conductors 36–39, respectively, with the outer conductors 31–34 cooperating with apertures in the wall of conduit 11 and rigidly secured thereto, as by soldering or brazing.

At the ends of the coaxial transmission lines 26–29 (Fig. 2) are positioned impedance elements, such as adjustable impedance standard 41, adjustable shorting plungers or stubs 42, 43 and an unknown impedance device 44, respectively. The impedance standard 41 is formed of an enlarged-diameter tubular portion 46 which constitutes a continuation of the outer conductor 31 of coaxial transmission line 26 and which is concentrically arranged with respect to the inner conductor 36. Intermediate the tubular portion 46 and the rod 36 is a tube 47, concentrically disposed relative to these members 36, 46 and forming a further coaxial transmission line 48 with the rod 36. At the end of the further transmission line 48 remote from the conduit 11 there is positioned an impedance element 49, which is of such magnitude to terminate the further transmission line 48 in its characteristic impedance. It will be noted that the inner diameter of the tube 31 and the tube 47 are equal, with the inner conductor 36 common to both of these members 31, 47.

Accordingly, the characteristic impedances of the coaxial transmission lines 26, 48 are equal.

Between the enlarged diameter tubular portion 46 and the tube 47 is arranged an apertured disk 51, which is concentrically positioned with respect to these members 46, 47 and slidably adjustable along the axis of the further transmission line 48. The inner surface of the enlarged-diameter portion 46 and the outer surface of the tube 47, together with the disk 51, constitute a shorted coaxial transmission line 50. The disk 51 is dimensioned to ensure satisfactory electrical contact with the tubular portion 46 and the tube 47, with the inner and outer edges of the disk 51 maintained in close contact engagement with the tube 47 and tubular portion 46 respectively. To facilitate the adjustment of disk 51 an adjusting member 52 is provided, which is rigidly attached to the disk 51 but free to move relative to tube 47 and tubular portion 46. The adjusting member 52 is preferably made sufficiently long to project beyond tubular portion 46 under all conditions of adjustment of the disk 51 to ensure its ready accessibility. For convenience, the disk 51 and the adjusting member 52 may be termed an impedance adjusting piston 55.

At the end of each of the coaxial transmission lines 27, 28 there is positioned an adjustable shorting plunger or stub 42, 43, respectively. Each of these stubs 42, 43 is constituted of an apertured disk portion 53 and a tubular portion 54, with the disk portion 53 arranged in close fitting engagement with the inner conductors 37, 38 and the outer conductor 32, 33, respectively, to insure efficient electrical connections therebetween. For convenience in adjustment, similar to the considerations discussed in connection with adjusting member 52, the tubular portion 54 of the stubs 42, 43 is preferably made to extend beyond the outer conductors 32, 33. By slidable adjustment of the stubs 42, 43 the impedance associated with coaxial transmission lines 27, 28 may be varied. Connected to the end of coaxial transmission line 29 by means of leads 56, 57 is an unknown impedance device 44.

The output coaxial transmission line 17 projects radially from the conduit 11 and has an axis, which may be seen most clearly in the plan view of Fig. 2, which is angularly displaced from the axes of the adjacent coaxial transmission lines 26, 27 by preferably 45°. The axis of the output line 17 preferably intersects the longitudinal axis of the conduit 11 and is oriented in a plane perpendicularly disposed relative to this axis of the conduit 11.

By means of leads 58, 59 the output transmission line 17 is electrically coupled to the detector 61, which, in turn, is connected electrically through leads 62, 63 to an indicating meter 64. The position of the energy-extracting means within the conduit 11, as will be discussed hereinbelow, is such as to be responsive to particular orientations of the polarization of energy of the $TE_{1,1}$ mode transmitted in conduit 11. Thus, the meter 64 is effective for indicating the angular position of the electric or E-vector of electromagnetic energy within conduit 11.

All of the coaxial transmission lines 12, 17, 26-29 preferably have their inner conductors 13, 18, 36-39 and their outer conductors 14, 19, 31-35 formed of a highly conductive material or structure plated with such material to provide highly conductive surfaces, thereby permitting an efficient transfer of electromagnetic energy. For instance, this may be accomplished by fabricating the above-specified parts of copper or brass. Similar considerations apply to the conduit 11, the enlarged diameter tubular portion 46, the tube 47, the disk 51 and the disk portion 53 of the adjustable shorting stubs 42, 43.

In order to facilitate coupling to impedance elements the coaxial transmission lines 12, 17, 26-29 are shown in Fig. 1 equipped with knurled rings 66, which may be internally threaded. Thus, impedance elements, such as the impedance standard 41, the shorting stubs 42, 43 and the unknown impedance device 44 may be associated with further coaxial transmission lines, which further lines may readily be joined to the coaxial lines 26-29 by means of the knurled rings 66. For simplicity, such rings have been omitted in Fig. 2 and the impedance elements 41-44 shown directly at the ends of the coaxial lines 26-29.

To support and position the rods on inner conductors 13, 18, 36-39 within the outer conductors 14, 19, 31-35 beads or supports 67 are employed, which are preferably constituted of low-loss dielectric material.

In Fig. 3 a $TE_{1,1}$ mode transducer or polarization controlling means includes an electromagnetic energy launching disk 68 which is arranged toward the top of the conduit 11, adjacent the input coaxial transmission line 12. The launching disk 68 is concentric with respect to and aligned along the longitudinal axis of the conduit 11. The upper and lower surfaces of the disk 68 preferably are disposed substantially in planes perpendicularly arranged with respect to the longitudinal axis of conduit 11. Having a diameter which is smaller than the inner diameter of the conduit 11, the disk 68 is spaced from the conduit 11. The rods or inner conductors 36-39 of the coaxial transmission lines 26-29 extend within the conduit 11 to electrically contact and mechanically support the flat disk 68.

The axes of the coaxial lines 26-29 may pass through the region of the disk 68 midway between its upper and lower surfaces. To accommodate the inner conductor 13 of the input coaxial transmission line 12 the disk 68 is formed with a centrally-disposed aperture 69. By providing the end of inner conductor 13 with longitudinally extending slots 71, an efficient electrical contact is insured between the inner conductor 13 and the disk 68, owing to the resilient connection.

The end of the inner conductor 13 remote from the launching disk 68 is provided with a central aperture or recess 70 for cooperating with a further coaxial transmission line, which may be employed for making connection to the source 23 of electromagnetic energy.

The end plate 16, which supports the input coaxial transmission line 12, is formed in close fitting engagement with the conduit 11, having a diameter very nearly equal to the internal diameter of the conduit 11. In view of the fact that the inner conductor 13 of the input line 12 is maintained in a fixed position with respect to the outer conductor 14 through the action of the bead 67 and in view of the fact that the inner conductor 13 projects through the aperture 69 of the disk 68 in a slidable contact relationship, the end plate 16 may be moved along the longitudinal axis of the conduit 11. Through this action the end plate 16 functions as a plunger to effect an impedance match between the device of Fig. 1 and the source 23 of electrical energy.

The end of the conduit 11 opposite the input coaxial transmission line 12 is closed by a further end plate 72, which may be joined to the adjacent portion of conduit 11 as by soldering or brazing.

As has been discussed hereinabove electromagnetic energy of the $TE_{1,1}$ mode is conveyed through the conduit 11, passing in the direction toward the end plate 72. To detect or determine the orientation of the polarization of such energy, a means for detecting the polarization orientation is provided, which means may take the form of an electromagnetic energy pickup element 73. Essentially the pickup element 73 is constituted of a continuation of the inner conductor 18 of the output transmission line 17 extending within the conduit 11. More particularly, the outer conductor 19 of the output line 17 may project for a distance within the conduit 11. A further coaxial transmission line 74, which is aligned along the axis of the output line 17 and positioned to project radially within conduit 11, is constituted of a tube 76 and inner conductor 18. A closing plate 77 serves to close the further transmission line 74, and additionally, support the inner conductor 18. The tube 76 and the outer conductor 19 may be joined to the wall of conduit 11, as by soldering or brazing.

Viewed somewhat differently, the output transmission line 17 is made to project diametrically across the conduit 11 and at right angles to its longitudinal axis. By providing an interruption in the outer conductor 19 of this line 17, a pickup element 73 is formed. Owing to the position of the pickup element 73 it is responsive to the orientation of the E-vector of energy transmitted through conduit 11.

The launching disk 68, the adjustable shorting plugs 42, 43, the tube 76, the tube 47 of the further transmission line 48, and the shorted transmission line 50 are preferably formed to provide highly conductive surfaces. The same considerations apply which were discussed hereinabove in connection with, for instance, the coaxial transmission lines 26-29.

It will be noted that means for exciting electromagnetic energy in the conduit 11, which means may include, for instance, the inner conductor 13 of the input line 12, is coupled to said conduit 11 at a first point along the axis. Energy-extracting means, such as pickup element 73, is arranged at a second point along the axis of the conduit 11.

In Fig. 4 the manner in which the rods or inner conductors 36–39 of the coaxial transmission lines 26–29 are joined to the launching disk 68 may be most clearly seen. Cooperating apertures or recesses 78 in the edge of disk 68 are arranged to receive the ends of the inner conductors 36–39. Of course, it is apparent that the joining operation may be effected in a variety of ways, such as by soldering.

In Fig. 5 it may be seen most clearly that the inner conductors 36–39 project radially within the conduit 11. Having rectilinear configurations, the inner conductors 36–39 extend in the same manner as previously described in connection with the coaxial transmission lines 26–29 of which they form a part. Thus, the axes of the rods or inner conductors 36–39 preferably are arranged in a mutually perpendicular relationship, intersect in a point along the longitudinal axis of conduit 11 and are disposed in a plane at right angles to the axis of the conduit 11. The last two considerations may be expressed more directly, for instance, by stating that the axes of rods 36–39 intersect the longitudinal axis of conduit 11 at right angles. The portions of the rods 36–39 extending within conduit 11 may be regarded as continuations or extensions of the inner conductors 36–39 of the transmission lines 26–29.

The dimensions of the input coaxial transmission line 12, as are the dimensions of the other coaxial transmission lines 17, 26–29, are suitable for transmitting the principal or TEM mode so that any higher order modes tending to be excited, such as at a discontinuity, are rapidly attenuated. Thus, the launching disk 68, which has a substantially flat, circular configuration, constitutes a $TE_{1,1}$ mode excitation means or a means for converting energy of the principal coaxial transmission line mode into the $TE_{1,1}$ mode.

Viewed somewhat differently, it may be stated that the launching disk 68 is provided at its periphery with a plurality of radially-extending rods 36–39.

The impedances, such as the impedance standard 41, the shorting stubs 42, 43, and the unknown impedance device 44 constitute impedance means coupled to the disk 68. Such impedances through the action, for instance, of the portions of the rods or inner conductors 36–39 extending within the conduit 11, constitute means for controlling the polarization or means for varying the orientation of the polarization of electromagnetic energy transmitted through conduit 11.

In operation, electromagnetic energy from source 23 is coupled to the input coaxial line 12. By moving the plunger on end plate 16, which snugly closes the end of conduit 11, along the longitudinal axis thereof, the impedance as seen by the source 23 may be adjusted to a desired value. Electromagnetic energy transmitted in the TEM mode in the input coaxial transmission line 12 enters the cylindrical conduit 11 and is launched in the $TE_{1,1}$ mode or dominant mode for a circular wave guide by the action of the launching disk 68, together with the portions of the rods 36–39 extending within the conduit 11, and the impedances 41–44, arranged at the ends of the coaxial transmission lines 26–29.

In the device of Fig. 1 impedances may be connected to the ends of the coaxial transmission lines 26–29 which have equal electrical characteristics. Care should be taken to achieve a substantially symmetrical arrangement of the parts of Fig. 1, such as the conduit 11, launching disk 68, and rods or inner conductors 36–39. Under conditions of such mechanical symmetry as well as equality of the impedances associated with the coaxial lines 26–29, equal currents will flow radially in all four directions from the launching disk 68. In other words, energy will flow radially and in a completely symmetrical manner as long as the launching disk 68 and its associated parts have symmetry and the impedances associated with the transmission lines 26–29 have equal electrical characteristics.

Under such circumstances voltages developed across opposed gap regions, defined respectively, by selected points on the outer edge or periphery of launching disk 68 and adjacent wall portions of the conduit 11, are equal and opposite in magnitude, whereby cancellation of these voltages occurs. Similarly, it will be noted that for every voltage vector considered there is an equal or oppositely directed voltage vector. Accordingly, there is no $TE_{1,1}$ mode energy coupled to the conduit 11.

In the event that an unbalance is present in the impedances associated with transmission lines 26–29, such an unbalance will result in the excitation and propagation of electromagnetic energy of the $TE_{1,1}$ mode through conduit 11. Theoretically speaking, it appears that where, for instance, unequal currents and voltages are present in the coaxial transmission line 26–29 as a result of different impedances associated therewith a component of energy will be present in the conduit 11 to which the pickup element 73 would be responsive.

As is well known, the field configuration of the $TE_{1,1}$ mode of electromagnetic energy for a circular wave guide is characterized, among other things, by a diametrically extending E-vector, the angular position of which may assume different directions. When the orientation of the polarization or the position of the E-vector of the circular wave guide $TE_{1,1}$ mode of energy transmitted through the conduit 11 is perpendicularly disposed relative to the axis of the pickup element 73, or more particularly, the rod or inner conductor 18 of the output coaxial line 17, then the pickup element 73 will not be excited by electromagnetic energy. Accordingly, a null indication will appear on the meter 64.

Thus with an unknown impedance device 44 it is possible to adjust the impedance standard 41 and the shorting stubs 42, 43 to achieve a null reading on the indicating meter 64. In other words, under conditions of initial unbalance, the shorting stubs 42, 43 and the slidable member 52 of the impedance standard 41 may be adjusted with an unknown impedance device 44 coupled to the coaxial transmission line 29 to angularly dispose the E-vector of electromagnetic energy transmitted in conduit 11 at right angles to the rod 18, thereby substantially reducing the magnitude of current passing to the meter 64 to zero.

The impedance standard 41, the operation of which will be discussed more fully below, may be adjusted to provide an arbitrary phase angle and, more particularly, to have the phase angle of the unknown impedance device 44. By movement of the adjustable shorting stubs 42, 43 a suitable combination of impedances may be provided, with the ratio of the impedances of stubs 42, 43 constituting a pure number. Generally speaking, the movement in the position of the shorting stubs 42, 43 requires a change in the setting of the adjusting member 52 associated with the impedance standard 41. Thus, by a series of steps, the adjustment of the shorting stubs 42, 43 serves to balance an amplitude factor and changes in the position of adjusting member 52 serve to balance a phase factor.

From actual experiments with the device of Fig. 1 including the arrangement of impedance elements 41–44 similar to those shown in Fig. 2 it appears that the interrelationship may be expressed generally as follows. The ratio of the magnitudes of the impedances of stub 42 to stub 43, multiplied by the impedance value of the standard 41 provides an indication of the magnitude of the impedance of the device 44. Such a result is obtained, more specifically, from the settings or the position of the disk portion 53 of the shorting stubs 42, 43 and the disk 51 of the impedance adjusting piston 55 along the axes of the coaxial transmission lines 27, 28 and transmission line 50, respectively.

It will be understood that in order to effect an impedance balance and obtain a null indication on the meter 64 that, generally speaking, it will be unnecessary to vary the axial position of both of the shorting stubs 42, 43. With the position of one of these stubs 42, 43 unchanged, the other of the stubs 42, 43 may be varied axially. This adjustment together with that of the piston 55 will effect a balance.

Under these circumstances it will be noted a variable resistance standard is not required. The adjustable impedance standard 41 is constituted of a fixed resistance component and a variable reactance component. The further coaxial transmission line 48, formed with the tube 47 and rod 36, is terminated in its characteristic impedance $Z_0$ by means of an impedance element 49. The variable reactance component of the standard 41 is provided by the length of the shorted coaxial line 50, which is constituted with the tube 47 as its inner conductor and the enlarged diameter portion 46 as its outer conductor. Thus, the equivalent circuit of the standard 41 is a resistance $Z_0$ in series with a variable reactance, the latter depending upon the axial position of the disk 51, the standard 41 thereby providing an impedance with a phase angle which can be adjusted to a desired value between plus or minus 90°.

By axial movement of the end plate 16, which functions as a plunger, the impedance of the source 23 may be adjusted to the device of Fig. 1. However, if desired this matching arrangement may be replaced by another type or dispensed with. In the latter case the end plate 16 may be rigidly secured to the conduit 11.

While the system of coaxial transmission lines 26-29 have been described as being of rigid construction and aligned in a particular configuration, such as mutually perpendicular exterior to the conduit 11, it will be understood that such an arrangement is a convenient manner to achieve the desired symmetrical position of the rods or inner conductors 36-39 of the lines 26-29 which project within the conduit 11. Similarly, it is apparent that the input and output coaxial transmission lines 12, 17, respectively, need not be of a rigid-type construction.

It will be understood that the impedance elements, including the impedance standard 41, the adjustable shorting stubs 42, 43 and the unknown impedance device 44, shown connected to the transmission lines 26-29 in Fig. 2 may be replaced by a variety of different type elements. For instance, as previously discussed, devices having equal electrical characteristics may be coupled to the lines 26-29. Moreover, with the impedance elements 41-44 employed in connection with the lines 26-29, they may be interchanged in a variety of ways. For instance, the standard impedance 41, the shorting stubs 42, 43 and the unknown impedance device 44 may be connected to the transmission lines 29, 28, 27, 26, respectively.

The launching disk 68 and all dimensions associated with it are not very critical. As a matter of fact, the disk 68 could theoretically be omitted. In such case, the rods or inner conductors 36-39 could optionally terminate after projecting for a distance within conduit 11 or extend to meet in a point along the longitudinal axis of the conduit 11. Thus, the portion of the rods 36-39 within the conduit 11 would provide a $TE_{1,1}$ mode excitation means or a means for controlling the polarization of the E-vector of electromagnetic energy transmitted in conduit 11. In brief, all of the terminology employed hereinabove in describing the launching disk 68 by itself or in combination with the rods 36-39 is equally applicable to the proposed modification. With the omission of the launching disk 68 it is apparent that with longer lengths of the rods 36-39 their inductance would be higher.

If desired, special precautions may be taken to minimize the reflection of electromagnetic energy within conduit 11. For instance, this may be accomplished by ensuring that the conduit 11 is matched in its characteristic impedance. Another possible arrangement involves means for obtaining isolation between the regions of the launching disk 68 and the pickup element 73. Attenuation, which may provide such isolation, may be achieved with two carbon strips placed 90° apart in the conduit 11.

In Fig. 6 an alternate arrangement is provided for extracting electromagnetic energy from the conduit 11, which may replace the previously-discussed pickup element 73. The energy-extracting means or polarization detecting means is provided by a pickup element 79 which is constituted of the rod or inner conductor 18 of the output transmission line 17 extending radially within the conduit 11. As previously described, the axis of this inner conductor 18 preferably intersects and is disposed at right angles to the longitudinal axis of conduit 11. To effect an efficient transfer of electromagnetic energy between the conduit 11 and the output line 17 the rod 18 may be axially positioned from the further end plate 72, in the well-known manner. Such a consideration is equally applicable to the previously-described pickup element 73.

It will be understood that the rectilinearly extending rod 18 within conduit 11 may be positioned elsewhere within the conduit 11 or replaced by a suitably disposed coupling loop. Generally speaking, such energy extracting means should be located to be responsive to electromagnetic energy of the $TE_{1,1}$ mode which may be excited or produced by currents flowing in the disk 68. Although not restricted in position except that the axis of the inner conductor 18 should not be aligned in plan view with the axes of transmission lines 26-28 or 27, 29, for greater sensitivity the inner conductor 18 may be positioned at 45° relative to these lines 26-29.

It appears that many apparently widely different embodiments of this invention could be made without departing from the scope thereof. As discussed above, for instance, the matching of the impedance of the source 23 could be omitted, the launching disk 68 could be dispensed with and the polarization detecting means may take the form of the pickup element 79 of Fig. 6. Consequently, it is intended that all matter contained in the above description or shown in the accompanying drawings shall be interpreted as illustrative and not in a limiting sense.

What is claimed is:

1. In a mode transducer, a circular electromagnetic energy conducting conduit dimensioned to transmit the $TE_{1,1}$ mode and attenuate the higher order modes, a coaxial transmission line having inner and outer conductors, a disk with a centrally-disposed aperture positioned within said conduit and perpendicularly oriented with respect to the longitudinal axis of said conduit, the inner conductor of said line extending within said conduit and smoothly fitting said aperture, said disk having a smaller diameter than said conduit, a plurality of radially-directed rods extending from said disk through apertures in the wall of said conduit, and means for coupling impedances to said rods, whereby energy in the principal coaxial line mode is converted into the $TE_{1,1}$ mode.

2. High frequency apparatus comprising a circular cross-sectional conduit having a longitudinal axis, a longitudinally slidable plunger snugly fitting one end of said conduit, said plunger having a centrally-disposed coaxial transmission line projecting from the exterior side thereof, a flat circular disk concentrically disposed about said axis, said disk being spaced from the inner wall of said conduit and having a centrally-disposed aperture, the inner conductor of said centrally-disposed line extending through the aperture of said disk in close fitting contact therewith, four coaxial transmission lines projecting exteriorly from said conduit and in the plane of said disk, the inner conductors of said four lines contacting the periphery of said disk, and a pick-up probe positioned adjacent the end of said conduit remote from said plunger.

3. Ultra high frequency apparatus comprising, a cylindrical conduit dimensioned to transmit the $TE_{1,1}$ mode of electromagnetic energy and attenuate the higher order modes, said conduit having a longitudinal axis, a system of four mutually-perpendicular coaxial transmission lines disposed in a plane perpendicular to said axis, each of said lines projecting radially from said conduit in a region toward one end of said conduit, a disk positioned in said plane and supported by the extensions within said conduit of the inner conductors of said lines, said disk having a diameter smaller than that of said conduit, a movable end plate snugly closing the end of said conduit adjacent said coaxial line system, said end plate having a centrally-disposed input coaxial transmission line arranged along said axis, said disk having an aperture for cooperating with the extension within said conduit of the inner conductor of input line, whereby the distance between said disk and said end plate may be varied, a further end plate fixedly attached to the end of said conduit most remote from said coaxial line system, and an output coaxial transmission line, said line extending across said conduit in a plane perpendicular to said axis and near said further end plate, said output line being disposed substantially at 45° with respect to adjacent coaxial lines of said system and having an interruption in its outer conductor within said conduit.

4. High frequency apparatus comprising a wave guide section having a circular cross-section, a plurality of coaxial lines having their inner conductors extending within said wave guide section through apertures in the wall thereof, said inner conductors being evenly spaced and located in a common plane at right angles to the axis of said wave guide section, an input coaxial line section having the inner conductor thereof located along the axis of and extending within one end of said wave guide section for coupling electromagnetic energy having the TEM mode to said wave guide section, the inner conductor of said input coaxial line section and the inner conductors of said coaxial lines being joined by a flat circular disc, and energy-extracting means responsive to energy propagated in the TE$_{1,1}$ mode positioned at the end of the circular wave guide section remote from the input coaxial line section.

5. High frequency apparatus comprising a wave guide section having a circular cross-section, a plurality of coaxial lines having their inner conductors extending within said wave guide section through apertures in the wall thereof, said inner conductors being symmetrically arranged so that adjacent inner conductors are disposed at right angles to one another and located in a common plane at right angles to the axis of said wave guide section, an input coaxial line section having the inner conductor thereof located along the axis of and extending within one end of the wave guide section for coupling electromagnetic energy having the TEM mode to said wave guide section, means terminating said coaxial lines whereby energy reflected by any one of said terminating means is coupled to the wave guide section in the TE$_{1,1}$ mode, and energy-extracting means responsive to energy propagated in said TE$_{1,1}$ mode positioned at the end of the circular wave guide section remote from the input coaxial line section.

6. The apparatus of claim 5, wherein the energy-extracting means includes an output coaxial line section having the inner conductor thereof extending within and across the circular wave guide section and disposed at a 45° angle with respect to the inner conductors of said coaxial lines.

7. The apparatus of claim 5, wherein said wave guide section is dimensioned to convey the TE$_{1,1}$ mode and attenuate the higher order modes at the operating frequency.

8. A high frequency bridge for measuring impedance of a test load comprising a section of circular hollow wave guide, an input coaxial line section coupled to one end of the wave guide section, the inner conductor of the input coaxial line section extending into the wave guide section along the axis of revolution of the wave guide section, an output coaxial line section coupled to the opposite end of the wave guide section, the inner conductor of the output coaxial line section extending into the wave guide section perpendicularly to the axis of revolution of the wave guide section, four coaxial branch arms coupled to the circular wave guide section, the inner conductors of the branch arms lying in a common plane at right angles to the axis of revolution of the wave guide section and extending into the circular wave guide section adjacent the input coaxial line section, adjacent inner conductors of the branch arms being perpendicular to each other, a movable shorting stub terminating each of a pair of adjacent branch arms, a fixed-resistance variable-reactance load terminating another of the branch arms, the impedance under test being coupled to the remaining branch arm, the inner conductor of the output coaxial line section being disposed at a 45° angle with respect to the inner conductors of the branch arms and lying in a plane bisecting the circular wave guide section and dividing the pair of shorted branch arms from the other two arms, and means coupled to the output coaxial line section for indicating a balance of the bridge.

9. A high frequency bridge for measuring impedance of a test load comprising a section of circular hollow wave guide, an input coaxial line section coupled to one end of the wave guide section, the inner conductor of the input coaxial line section extending into the wave guide section along the axis of revolution of the wave guide section, an output coaxial line section coupled to the opposite end of the wave guide section, the inner conductor of the output coaxial line section extending into the wave guide section perpendicularly to the axis of revolution of the wave guide section, four coaxial branch arms coupled to the circular wave guide section, the inner conductors of said branch arms being conductively joined within the circular wave guide section, adjacent inner conductors of the branch arms being perpendicular to each other, a movable shorting stub terminating each of a pair of adjacent branch arms, a fixed-resistance variable-reactance load terminating another of the branch arms, the impedance under test being coupled to the remaining branch arm, the inner conductor of the output coaxial line section being disposed at a 45° angle with respect to the inner conductors of the branch arms and lying in a plane bisecting the circular wave guide section and dividing the pair of shorted branch arms from the other two arms, and means coupled to the output coaxial line section for indicating a balance of the bridge.

10. Apparatus as defined in claim 8 in which conductive means is provided for electrically joining the inner conductor of the input coaxial line section to the inner conductors of said branch arms.

References Cited in the file of this patent

UNITED STATES PATENTS

| Number | Name | Date |
|---|---|---|
| 2,088,749 | King | Aug. 3, 1937 |
| 2,129,711 | Southworth | Sept. 13, 1938 |
| 2,147,717 | Schelkunoff | Feb. 21, 1939 |
| 2,441,598 | Robertson | May 18, 1948 |
| 2,458,579 | Feldman | Jan. 11, 1949 |
| 2,514,678 | Southworth | July 11, 1950 |
| 2,514,679 | Southworth | July 11, 1950 |